UNITED STATES PATENT OFFICE.

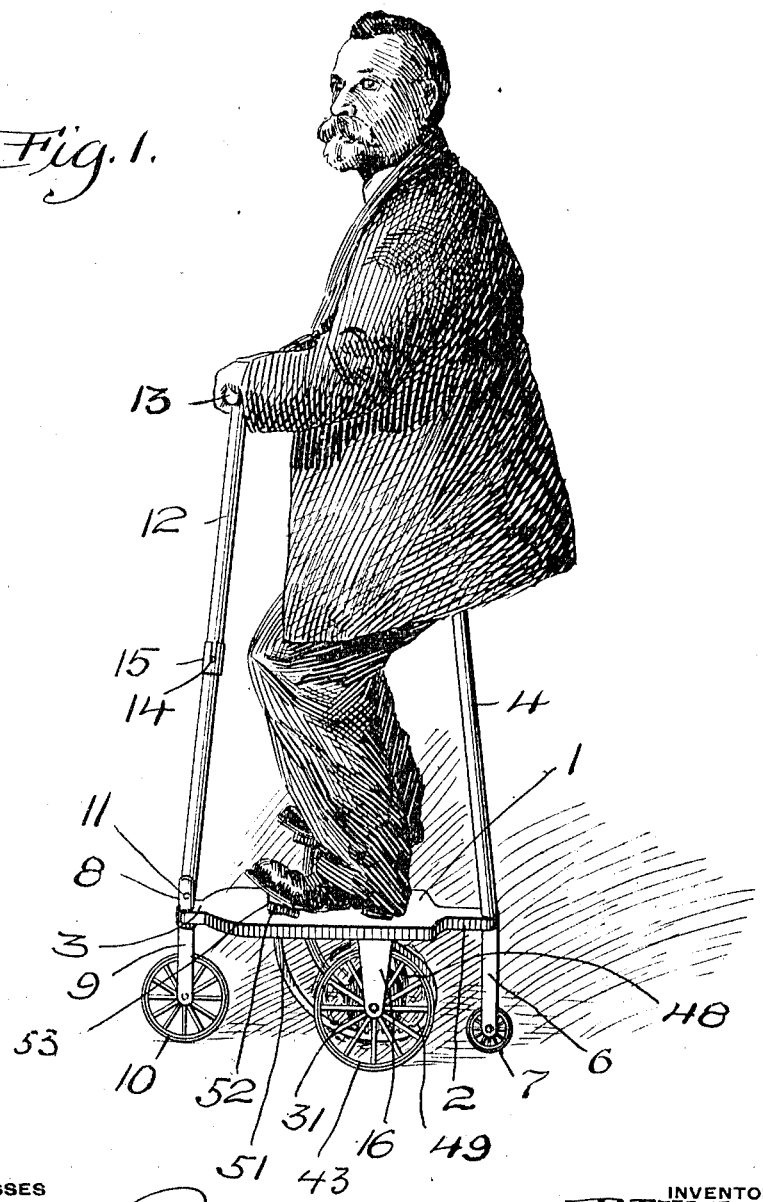

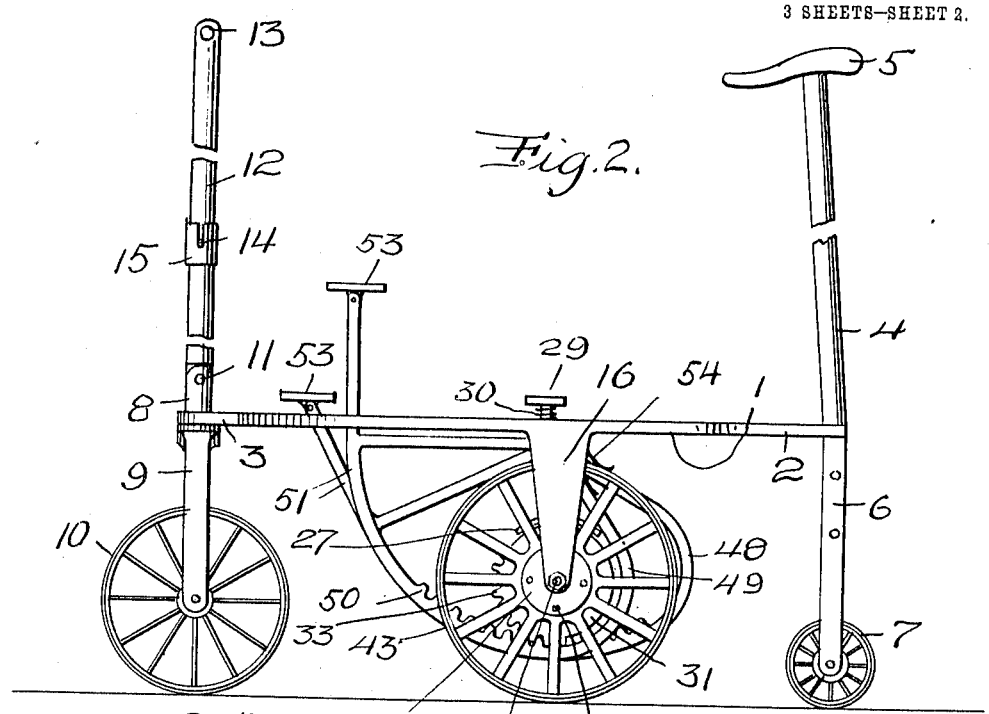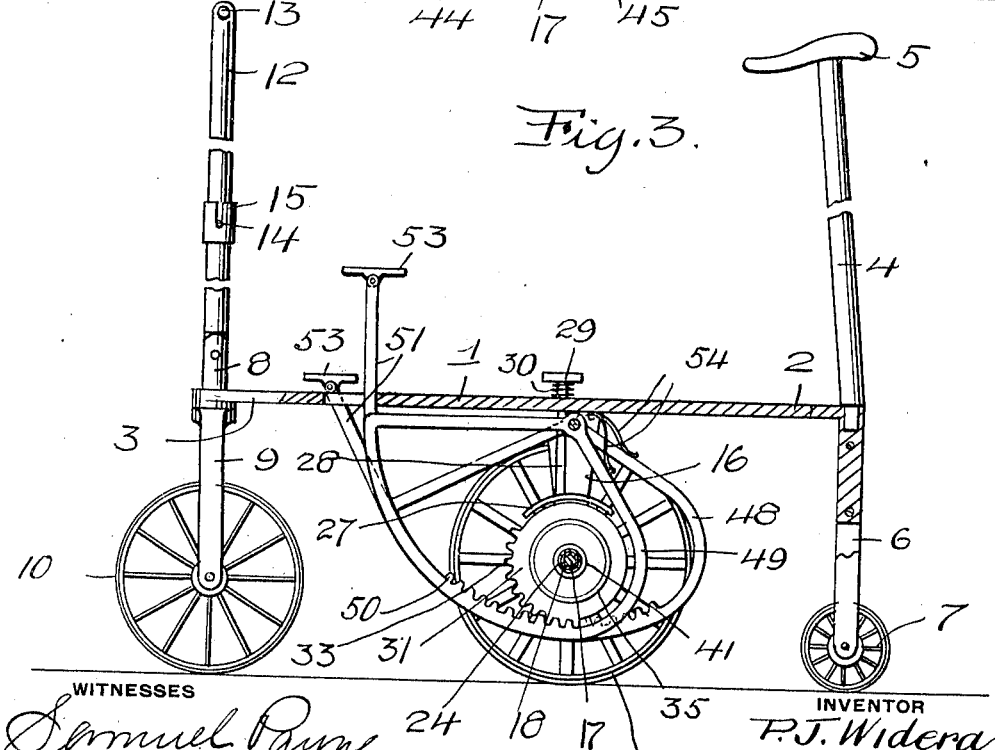

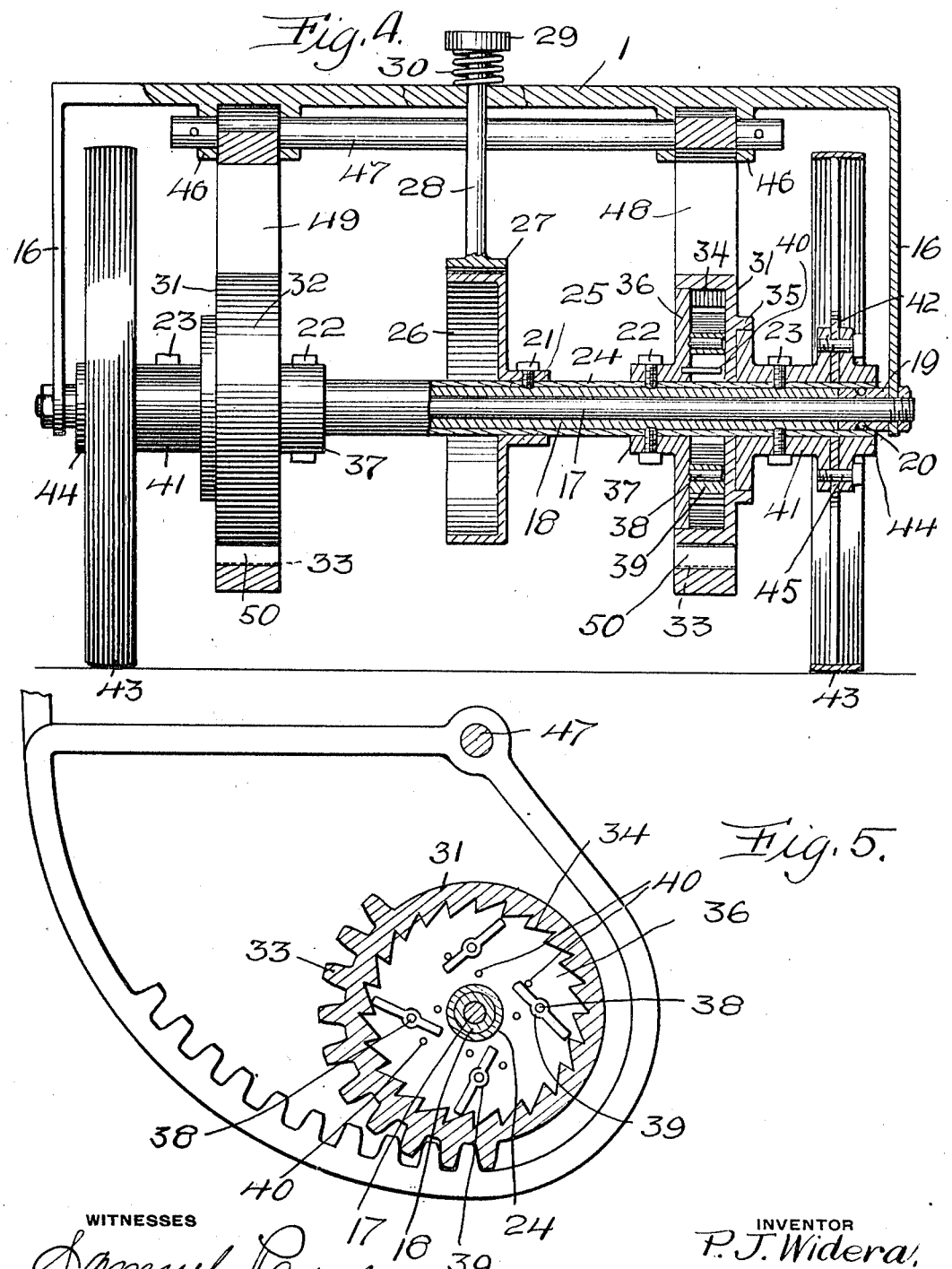

PAWEL J. WIDERA, OF CHICAGO, ILLINOIS.

PEDAL-PROPELLED VEHICLE.

1,072,284.   Specification of Letters Patent.   Patented Sept. 2, 1913.

Application filed March 6, 1913.   Serial No. 752,359.

*To all whom it may concern:*

Be it known that I, PAWEL J. WIDERA, a citizen of the United States of America, residing at Chicago, in the county of Cook and State of Illinois, have invented certain new and useful Improvements in Pedal-Propelled Vehicles, of which the following is a specification, reference being had therein to the accompanying drawing.

This invention relates to pedal propelled vehicles, and the primary object of my invention is to provide a small and compact vehicle that can be easily and quickly propelled and steered by the occupant thereof.

Another object of this invention is to provide a vehicle having novel treadles and a mechanism whereby a rotary movement can be imparted to wheels by the treadle action of the vehicle.

A further object of this invention is to provide a vehicle consisting of comparatively few parts that are inexpensive to manufacture, easy to assemble and highly efficient as a miniature vehicle.

With the above and other objects in view the invention resides in the novel construction, combination and arrangement of parts to be hereinafter specifically described and then claimed.

Reference will now be had to the drawings, wherein:—

Figure 1 is a perspective view of the vehicle, Fig. 2 is a side elevation of the same partly broken away, Fig. 3 is a longitudinal sectional view of the same, Fig. 4 is an enlarged cross sectional view of a portion of the vehicle, and Fig. 5 is an enlarged longitudinal sectional view of a portion of a vehicle.

Further describing my invention in detail with reference to the accompanying drawings, wherein like numerals denote corresponding parts throughout: 1 denotes a platform having the forward and rear ends thereof reduced, as at 2 and 3. The reduced end 2 of the platform 1 is provided with a detachable seat pedestal 4 having a seat 5 and with a depending bearing 6 for a revoluble trailer wheel 7.

8 denotes a steering pin movably mounted in the reduced end 3 of the platform 1 and the lower end of said pin has a bearing 9 for a revoluble steering wheel 10. Pivotally connected to the upper end of the pin 8, as at 11 is a sectional steering post 12 having a handle bar 13 that can be easily gripped by an occupant of the seat 5. The steering post is made of two sections hinged together, as at 14 whereby the upper section can be moved when a person mounts the vehicle. The upper section of the post is retained in alinement with the lower section thereof by a shiftable sleeve 15 adapted to inclose the pivot connection between the sections of the steering post and maintain said sections rigid.

16 denotes depending transversely alining hangers carried by the sides of the platform 1 and connecting the lower ends of said hangers is a tie rod 17. Revolubly mounted upon the tie rod 17 is a sleeve 18 having detachable end sections 19 provided with anti-friction bearings 20. Secured to the sleeve 18 by screw bolts 21, 22 and 23 is a tube 24 and mounted intermediate the ends of said tube and retained in engagement therewith by the screw bolt 21 is the hub 25 of a brake wheel 26. Located above the brake wheel 26 is a brake shoe 27, carried by the lower end of a brake rod 28 movably mounted in the platform 1 and provided with a tread 29. A coiled spring 30 encircles the rod 28 between the platform 1 and the tread 29, whereby the shoe 27 will be held normally out of engagement with the brake wheel 26, but can be easily shifted into engagement therewith by placing the foot upon the tread 29.

31 and 32 denote drums loosely mounted upon the tube 24 and the periphery of said drums are provided with teeth 33 whereby said drums can be used as sector gears. The inner walls of the drums are provided with ratchet teeth 34. The outer sides of the drums 31 and 32 are closed and provided with annular flanges 35 and the inner sides of the drums are closed by heads 36 having the hubs 37 thereof secured to the tube 24 by the screw bolts 22. The heads 36 are provided with inwardly projecting pivot pins 38 having pawls 39 arranged whereby the outer ends thereof can engage the ratchet teeth 34. The inner ends of the pawls extend between spaced stops 40 whereby said pawls are limited in their movement.

41 denotes inner hub members engaging the outer sides of the drums 31 and 32 and the inner sides of the webs 42 of power wheels 43. The inner hub members 41 are held in engagement with the tube 24 by the screw bolts 23 and coöperating with the inner hub members 41 are outer hub members 44 that are held in engagement with the wheels 43 by screw bolts 45 that are tapped into the outer ends of the inner hub members 41.

46 denotes sets of depending bearings carried by the platform 1 and located above the drums 31 and 32. The bearings are connected by a transverse pivot rod 47 and loosely mounted upon said rod are actuating members 48 and 49 associated with the drums 31 and 32 respectively. The actuating members 48 and 49 have curved racks 50 meshing with the teeth 33 of said drums, and said actuating members are provided with tread supports 51 that extend upwardly through openings 52 provided therefor in the platform 1. Treads 53 are pivotally connected to the upper ends of the supports 51. Engaging the actuating members 48 and 49 are flat compression springs 54 and these springs are employed for elevating the treadles when released by the feet.

In operation, the feet are employed for rocking the actuating members 48 and 49 upon the pivot rod 47 and power is alternately applied to the drums 31 and 32 and through the medium of the pawls 39 power is applied first to one of the wheels 43 and then to the other. The arrangement of the ratchet teeth 34 permits of the pawls of one drum receding over the teeth while power is applied to the other drum, and it is through the medium of the brake mechanism that the movement of the vehicle can be retarded after the feet have been removed from the treads 53.

While in the drawings there is illustrated a preferred embodiment of the invention, it is to be understood that the structural elements are susceptible to such variations and modifications as fall within the scope of the appended claims.

What I claim is:—

1. A pedal propelled vehicle comprising a platform, a steering wheel at the forward end thereof, a steering post for moving said wheel, a seat carried by said platform, depending hangers carried by said platform, a rod connecting said hangers, a tube revolubly supported by said rod, drums loosely mounted upon said tube, heads mounted upon said tube and extending into said drums, a ratchet mechanism within said drums for alternately moving said heads, wheels mounted upon said tube, and actuating members pivotally supported from the bottom of said platform and adapted to impart movement to said drums.

2. A pedal propelled vehicle comprising a platform, a seat carried thereby, a steering wheel at an end of said platform, hangers carried by said platform, a rod connecting said hangers, a tube revolubly supported by said rod, drums loosely mounted upon said tube, heads carried by said tube and extending into said drums, a ratchet mechanism within said drums for imparting movement to said heads, wheels mounted upon said tube adjacent to said hangers, actuating members pivotally mounted beneath said platform for imparting movement to said drums, and treadles in connection with said actuating members.

In testimony whereof I affix my signature in the presence of two witnesses.

PAWEL J. WIDERA.

Witnesses:
 ADOLF PASTERY,
 THOS. KOSMIDER.

Copies of this patent may be obtained for five cents each, by addressing the "Commissioner of Patents, Washington, D. C."